Feb. 22, 1938.  E. R. SANDMEYER  2,108,869
FRUIT SORTING AND PACKING SYSTEM
Filed Jan. 22, 1935  2 Sheets-Sheet 1
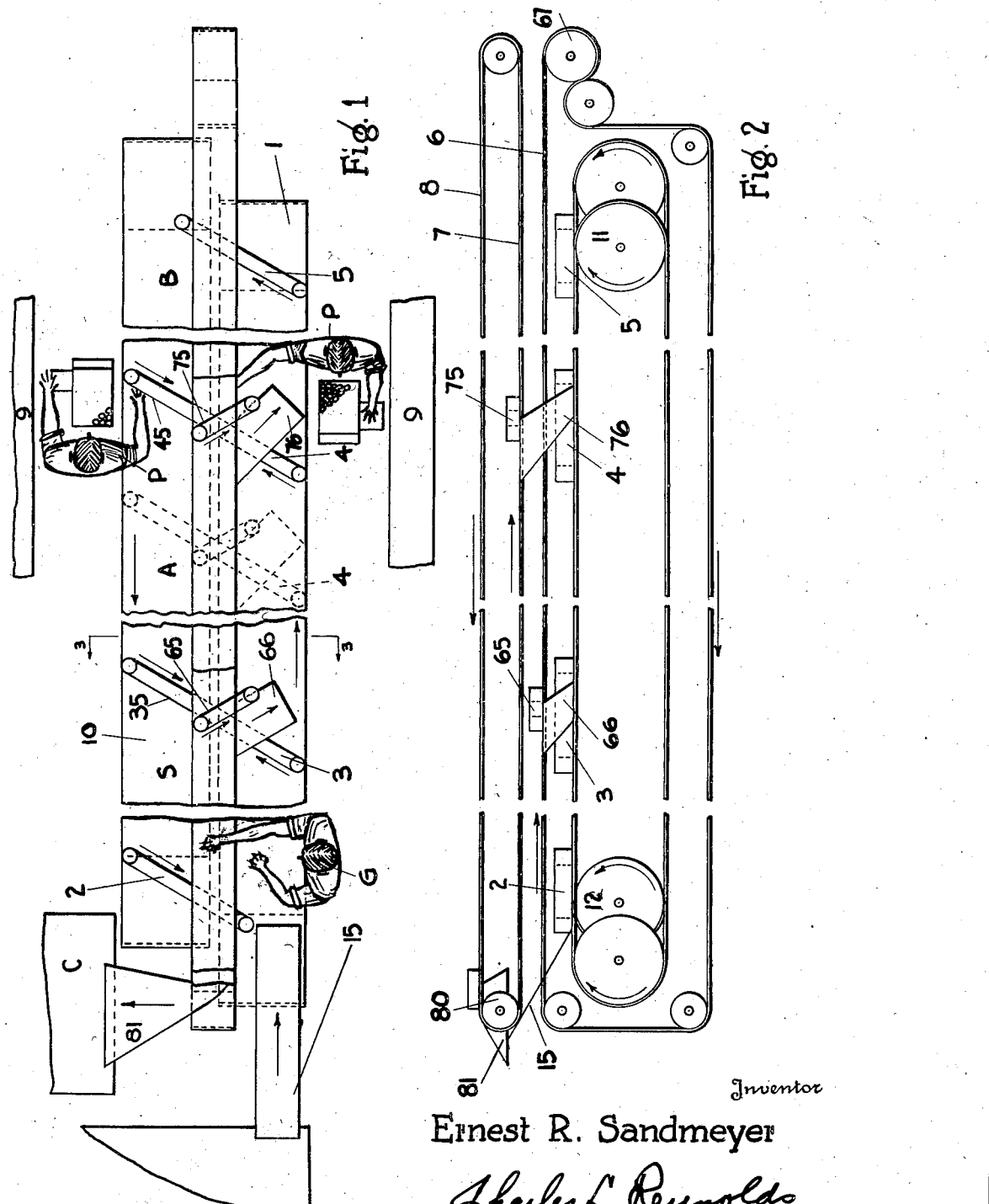
Inventor
Ernest R. Sandmeyer
By Charles L. Reynolds
Attorney Feb. 22, 1938.                E. R. SANDMEYER                2,108,869
                        FRUIT SORTING AND PACKING SYSTEM
                        Filed Jan. 22, 1935        2 Sheets-Sheet 2

Inventor
Ernest R. Sandmeyer
By Charles L. Reynolds
Attorney

Patented Feb. 22, 1938

2,108,869

UNITED STATES PATENT OFFICE 2,108,869

FRUIT SORTING AND PACKING SYSTEM

Ernest R. Sandmeyer, Yakima, Wash.

Application January 22, 1935, Serial No. 2,869

11 Claims. (Cl. 209—125)

My invention relates to a fruit sorting and packing system which may be used in sorting and/or packing operations for fruit or vegetables.

In various fruit conveying systems heretofore proposed for use in sorting and packing operations a large amount of floor space was required, and these systems were not readily adapted to pack fruit where some one class such as of size or grade predominated. In general, the conveying mechanism for sorting the fruit was quite separate from and independent of the packing mechanism. Similarly the packing mechanism for each grade was quite separate from the packing mechanism for any other grade. Thus if in a particular lot of fruit most of it could be classed in grade A, the packing mechanism for grades B and C, if the fruit was graded into three classes, would be almost idle, while the packing mechanism for grade A would be overloaded. Similarly, if a particular lot of fruit ran largely to grade C, the mechanism handling this grade would be overloaded, while the grade A and grade B mechanism would carry but very little load. Furthermore, the old-style packing mechanism for each grade was designed to accommodate a definite number of workmen, and hence when the mechanism handling a particular grade was overloaded, there was no room for additional workmen to assist in packing this grade. Because of the tendency of different lots of fruit to vary in grade in the same season, or for the proportions of different grades to vary from season to season, such installations resulted in a substantial part of the entire packing mechanism at any one time carrying but little load, while other parts of the mechanism would be operating at full capacity.

It is the principal object of my invention, therefore, to provide a sorting and packing system in which the mechanism handling the fruit sorting and the packing of the various grades can be compensated to handle varying loads according to the particular crop or lot of fruit being sorted and packed.

Another purpose of my system is to coordinate the sorting and packing operations, so that if a large part of a certain fruit lot is culls, which are not to be packed, additional workmen can be employed in sorting fruit with fewer engaged in packing grades A and B, or if desired, more workmen may be employed in packing one grade than in packing another, and the grade which most workmen are packing may be any one of the several grades, as conditions require. Moreover, this operation is accomplished without any of the mechanism of the system remaining idle, or but slightly loaded, as has been the practice heretofore.

Another object of my invention is to provide fruit sorting and packing mechanism which will occupy the minimum of floor space, but which nevertheless may provide for sorting and packing as many grades of fruit as desired.

Fruit packers work at high speed, and their actions become automatic. They are accustomed to grasp a fruit in the right hand, simultaneously grasping a wrapper in the left, and bringing the two together above the box in a quick wrapping movement, the right hand again reaching for an apple as the left hand, holding the fruit, places the latter in its position in the box, and again reaches for a new wrapper. Any disturbance of this routine interrupts the automatic actions, slows down and fatigues the packer. It is therefore another object of my invention to provide a packing arrangement whereby all the packers will work in positions where the fruit is approaching them, and they will never be required to grasp at fruit as it recedes from them, and whereby they will be enabled to work automaticaly, in the accustomed manner. This object is obtained while using all available space adjacent to the path of travel of the fruit for packers' stations.

A further object is to improve the arrangement for sorting, making this operation more convenient for the sorters, and insuring, where desired, that all fruit is definitely sorted and graded.

Other objects of my invention, and more particularly those inherent in the arrangement of my system illustrated, will be evident from the following description and the accompanying drawings.

My invention comprises the system and mechanism, and more particularly the correlation and arrangement of the various parts, illustrated in the accompanying drawings, described in the specification, and defined by the appended claims.

The drawings show an installation of my system which will accomplish the desired results, but the particular mechanism illustrated is intended only as an example of one embodiment of my invention.

Figure 1 is a diagrammatic plan view, and Figure 2 a diagrammatic side elevation of my invention, showing the general arrangement of the parts, but omitting mechanical details.

Figure 3:
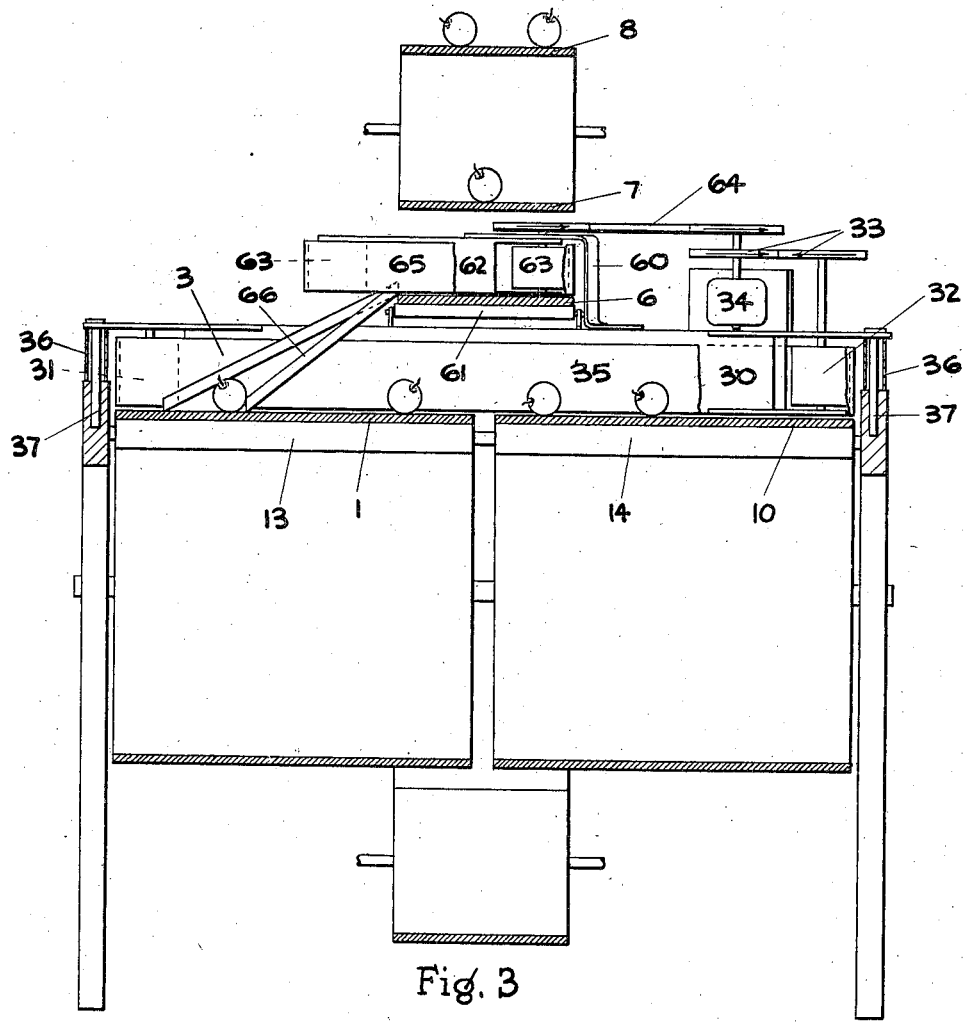
Figure 3 is a transverse sectional view taken along line 3—3 of Figure 1, showing some of the mechanical details.

The general arrangement of my sorting and packing system provides a number of in line compartments, one preferably being arranged for sorting and the rest for packing separately the several classes such as sizes or grades of fruit. In each of these compartments the fruit is circulated in a counterclockwise direction so that it will always advance toward the workmen adjacent to the compartments. The several compartments may be varied in size according to the relative loads carried, as will be explained hereafter.

The circulating system consists of a pair of fruit conveying belts 1 and 10, disposed in side by side relation, preferably contiguously, that is, substantially meeting so that an apple cannot drop therebetween, and running lengthwise through all the fruit-circulating compartments, and each moving in a direction opposite to the other, as shown by the arrows in Figure 1. The term "belt" is to be understood as a general designation of any suitable fruit transfer mechanism, such as rollers or chains, or even slightly inclined chutes, and I do not intend its meaning to be restricted only to belts. The particular type of transfer mechanism employed will, of course, depend on the requirements of the individual installation. A plurality of separate compartments is created by baffles 2, 3, 4 and 5 extending transversely across the two fruit transfer belts. The several compartments formed by these baffles are designated S, which may be the sorting compartment, A, which may be the compartment receiving grade A fruit, and B, which may be the compartment receiving grade B fruit. Compartments A and B are the packing compartments, and the number of these may, of course, be increased to allow any number of different grades to be packed separately, merely by increasing the number of transverse baffles.

Above the transfer belts, preferably arranged in superposed position, are fruit distributing belts 6, 7 and 8, delivering respectively grade A fruit and grade B fruit to their packing compartments, and culls from the sorting compartment, or culls erroneously reaching the several packing compartments, to the cull bin. The number of these belts will, of course, vary with the number of packing compartments, varying with the number of fruit grades packed separately. When the apples have been packed the boxes may be carried away from the packing stations by belts 9 disposed parallel to the main fruit transfer belts. If it is not desired to pack the culls they may be carried along by belt 8 to be deposited in a bin C.

In Figure 3 is shown an elevational view of the partitioning baffle 3, illustrating a working form of driving and supporting mechanism. The baffles may consist merely of inclined boards, but I prefer to employ upright shunting belts as illustrated. The bending baffle 3 consists of a backing board 30, at one end of which is supported an idler pulley 31, while at the other end is mounted a pulley 32 driven through gears 33 by a motor 34. Around the pulleys and across the face of the backing board 30 extends a shunting belt 35 which moves in the direction of the arrows shown in Figure 1. The impact of fruit against the baffle is considerably decreased by providing this belt so that the fruit is not bruised. The movement of the belt also assists in carrying the fruit over onto the oppositely moving belt, thus decreasing congestion.

This baffle 3, and likewise the baffle 4, may be shifted bodily lengthwise of the belts 1 and 10 to vary compensably the relative sizes of the compartments S, A and B, that is, one compartment may be enlarged any desired amount by correspondingly decreasing the size of the adjacent compartment, without changing the number of the compartments. Baffles 2 and 5 may be fixed in position since the size of the compartments may be adjusted in any desired manner by shifting only baffles 3 and 4. To decrease the size of compartment A, for example, baffle 4 may be moved bodily from the solid line position to the dotted line position shown in Figure 1. The attitude or angular relation of the baffle to the belts need not and should not be altered by such bodily movement. To permit these partitioning baffles to be shifted they may be supported at each end by sleeves 36 bearing on the conveyor side flanges and surrounding pins 37. These pins may be received in any of a number of holes spaced along side flanges, to maintain the end of the baffle 3 in proper position. Any suitable means to accomplish this adjustment may be employed.

Since the baffle illustrated in Figure 3 is that separating the sorting compartment and the grade A compartment, mechanism for shunting the fruit from the grade A delivery belt 6 into compartment A may be combined with the baffle 3. This mechanism has been illustrated as being supported from the backing piece 30 by means of a strap iron bracket 60. The belt 6 is kept from sagging down onto the baffle 3 by a roller 61 supported on the baffle 3.

This auxiliary shunting baffle extending across the top of the delivery belt 6 has a backing piece 62 which supports at its ends pulleys 63, one of which is driven from the motor 34 by means of a belt 64 or other suitable drive. A shunting belt 65 is carried by the pulleys 63 and travels in the direction indicated by the arrows in Figure 1. Supported also from the backing piece 30 is a chute 66, down which fruit may slide from the belt 6 onto the belt 1. This chute 66 may be removed so that upon removal of the pins 37 the entire assembly including baffle 3 and the shunting baffle extending across the belt 6 may be removed from its operative position or adjusted lengthwise of the machine without having to remove any of the delivery belts, or disturbing the transfer belts.

Figure 4:
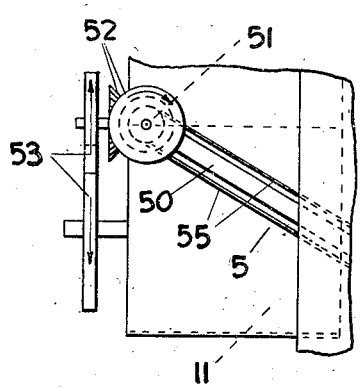
Figure 4 is a fragmentary plan view, showing certain mechanical details.

A suitable drive for the shunting belts of the end baffles 2 and 5 may be taken from driving mechanism for belts 1 and 10, respectively, if desired, instead of employing a separate motor for each of such drives as illustrated in Figure 3. A system might be employed to drive all the belts on the several baffles from a single power source, if desired, but I consider it preferable to drive the belts on the intermediate baffle assemblies by independent motors. In Figure 4 the baffle belt 55 is supported on the pulley 51, which in turn is driven by bevel gears 52. These bevel gears are in turn driven by spur gears 53 driven from the pulley 11 which carries one end of and drives the belt 1. The pulley 51 and its gear 52 are supported from the backing piece 50.

Various mechanism within the skill of the mechanic may be devised for supporting and driving the several fruit delivery and fruit transfer belts. As illustrative of such driving means, the belt 1 is driven by the pulley 11, while the belt 10 is driven by the pulley 12. The pulley 67 drives the belt 6, and the pulley 80 drives the belt having lower and upper runs 7 and 8. To support the belts 1 and 10, intermediate rollers 13 and 14 are shown in Figure 3. Any form of driving and belt-supporting mechanism which is found to be desirable may, however, be substituted for that shown, without departing from the spirit of my invention.

For purposes of illustration I have shown my system used in the sorting and packing of apples, though it is equally well adapted for use in other fruit industries, such as in sorting and packing pears, plums, peaches, oranges, and the like. Fruit is delivered in an ungraded condition down a chute 15 onto one of the transfer belts 1. Carried along by this belt the fruit comes into contact with the baffle 3, and is shunted, aided by means of the belt 35, onto the belt 10 traveling in the direction opposite to belt 1. By this belt the fruit is carried back towards the feed end of the system, where it encounters the baffle 2 and is shunted back onto the belt 1, thus completing a circulating cycle in a counterclockwise direction. Graders G stand or sit at each side of the pair of belts 1 and 10 constituting a circulating unit. The fruit to be sorted is thus circulated in the manner stated through a closed path past the graders, and they may select from the passing fruit any which they choose. Grade A fruit, selected from the mass, is placed upon belt 6, grade B fruit is placed upon belt 7, while culls and, in the instant installation, fruit below the first two grades are placed on the belt 8 which discharges into the chute 81, leading to the hopper C. If preferred, the baffle 2 may be removed, and all fruit not placed on the belts 6 and 7, by the time it reaches the end of belt 10, may be considered cull fruit, and may be discharged off the end of belt 10 into the cull bin C.

The grade A fruit, carried by the belt 6, contacts the baffle adjacent to the grade A compartment, A, where it is shunted by the belt 65 into the chute 66, to be deposited upon the belt 1. This belt, then, carries the fruit in the direction of the arrow until it strikes the baffle 4, where it is shunted, with the assistance of the belt 45, onto the oppositely moving belt 10. On this belt the fruit travels back until it encounters the baffle 3, where, with the help of the belt 35, it is carried back onto the belt 1. In this packing compartment for grade A fruit it will be seen that the apples circulate about an orbit in a counterclockwise direction. Packers P stand at each station immediately adjacent to the circulating unit at the unobstructed sides of the belts 1 and 10, and select and remove apples from the belt as they advance toward the workmen.

The circulation of the fruit in a direction approaching the packers, and in a path immediately adjacent to the packers, greatly facilitates the packing operation. Every apple advances within easy reach of the packer and he may spot in advance the apple which he is next going to remove from the belt. He does not snatch at apples suddenly emerging from behind him and receding from him as he must do in some packing systems. Instead every action is deliberate and methodical. As he is wrapping one apple the packer may pick out with his eye from the mass of apples moving toward him the next to be removed from the belt. This selected apple is picked up with the right hand, a wrapper is simultaneously picked up with the left hand, the two hands are brought together and the apple wrapped and deposited in the box, and meanwhile the packer is visually selecting the next apple to be packed.

The packer's cycle of operation thus approaches a rhythm. Each action is deliberate, each movement being exactly planned before it is initiated. No lost motion is present and speed is increased while fatigue is materially lessened. Each movement is that most convenient for the packer, the right hand being the one most natural with which to grasp the fruit.

Furthermore it may be desirable to have selected packers for each compartment pack apples of selected sizes. Thus one packer would choose from his compartment apples of a particular size only, while another packer would select from the same compartment apples of another size. Since the apples always approach toward the packer, he has ample opportunity to pick from the mass the apples of the particular size which he is packing before they get to him. With my system, therefore, the fruit moves in a manner most convenient for selection and removal of the fruit from the belt by the packer, while at the same time all the space available adjacent to the circulating path of the fruit may accommodate packers. A maximum number of packers thus pack with the greatest convenience and least effort from mechanism occupying a minimum amount of floor space.

Grade B fruit is carried by belt 7 until it encounters the baffle adjacent to compartment B, where it is shunted by belt 75 into chute 76, and deposited upon belt 1. The fruit then circulates in this compartment, encountering baffles 4 and 5, in the same manner as fruit is circulated in compartment A, as described above. The packers here also stand immediately alongside the circulating belts and pack fruit moving toward them. When the boxes are filled the packers place them on transfer belts 9 where they are carried away from the packing stations.

If in the particular lot of fruit being packed grade B predominates, compartment B, circulating this grade of fruit, may be enlarged, and compartment A, circulating grade A fruit, will be diminished to the same extent. To accomplish this the baffle 4, upon which is carried the baffle belt 75, shunting fruit from belt 7, may be shifted from the solid line position shown in Figure 1 to the dotted line position. Not only does this manipulation increase the closed path about which the grade B fruit circulates, but as shown at the upper side of the figure, a packer's station which previously was adjacent to compartment A will now be adjacent to compartment B. This packer will now pack grade B fruit instead of grade A fruit.

The system may thus be adjusted so that the concentration of fruit carried by the belts 1 and 10 at all points will be approximately the same. Since, however, in the hypothetical case suggested, more grade B fruit than grade A fruit is being delivered, the adjustment mentioned will allow more packers to pack this grade without increasing the congestion in the slightest. The packers may, as a matter of fact, remain in their original stations. In this way, therefore, not only may compensation be made to increase the space allotted to a particular grade of fruit, when that grade predominates, but at the same time more workmen are employed in packing this predominating grade, while automatically fewer workmen are packing the grade or grades which do not predominate and which are circulating through smaller orbits. At the same time, all grades are taken care of, and it is not necessary to eliminate packing of any grade because of increase in the space allotted to some other grade.

If, on the other hand, a particular lot of apples runs heavily to culls, which are not packed, there will be fewer apples selected from the sorting compartment S which are placed upon the grade A and grade B belts 6 and 7. Hence the graders, if no compensation were provided, would be working at full capacity, while all of the packers would be relatively idle. To remedy this situation, baffles 3 and 4 would both be moved to the right in Figures 1 and 2 to decrease in size both packing compartments, while the sorting compartment S would be correspondingly enlarged. The result of this maneuver would be that some of the packers previously packing grade B fruit would now be packing grade A fruit at the right hand end of the new compartment A, while the workmen previously packing grade A fruit at the left hand end of compartment A would now be opposite the enlarged sorting compartment. They would therefore stop packing, and would assist the graders in culling out the apples below grades A and B and in sorting and placing upon belts 6 and 7 the grade A and grade B fruit, respectively.

The ultimate result in this situation would be that the total number of packers were decreased, but the rate at which each workman packed would remain approximately the same as when the percentage of culls in a lot of fruit was small. The number of graders, on the other hand, would be increased, so that while the proportion of apples being sorted to those being packed would be considerably greater than would normally be the case, the graders would not be overworked because their number would be increased. Even in a situation of this kind it will be evident that the fruit would be about evenly distributed over both belts 1 and 10 throughout their entire lengths.

It will be seen, therefore, that while my sorting and packing system occupies at all times a constant floor space, it is nevertheless very flexible and may be arranged to accommodate widely varying lots of fruit, whichever grade predominates, yet without eliminating any grade. The compensating mechanism, moreover, is extremely simple, any desired adjustment being accomplished merely by shifting baffles 3 and 4 lengthwise of the circulating unit comprising the pair of belts 1 and 10. It is unnecessary, of course, to shift baffles 2 and 5 since these merely define the ends of the belts.

Furthermore, if desired, the fruit may be sorted prior to its being delivered to the belt 1, and the sorting compartment S may be transformed into a packing compartment so that three grades may be packed with the apparatus shown. If the sorting compartment is desirable in addition to three packing compartments, additional superposed delivery belts may be provided cooperating with additional shunting baffles and partitions.

On the other hand, if only a single grade is to be packed, the baffle 4 may be entirely removed, or moved to the extreme right-hand end of the belts 1 and 10, as viewed in Figure 1, adjacent to the baffle 5. The entire length of the transfer belts will then form only two compartments, one for sorting and one for packing, and the baffle 3 may be shifted to make these of the desired relative sizes. The system may thus be adapted as desired to any requirements without overloading any part, and without any equipment or workmen remaining idle.

The belts 1 and 10 have been illustrated and described as circulating the fruit in a counterclockwise direction for the greater convenience of right-handed packers, the fruit in such case advancing toward the packers. If for any reason, such as where left-handed packers predominate in a given organization, it should be desired, the direction of travel of each of belts 1 and 10 may be reversed and correspondingly, the angle of the shunting baffles may be changed, so that the fruit will all circulate in a clockwise direction, rather than in a counterclockwise direction as described.

What I claim as my invention is:

1. A fruit sorting and packing device, comprising, in combination, a table, two oppositely moving belts, each of a width substantially half the width of said table, disposed on the table in edge-to-edge relationship, a plurality of partitions inclined relatively to the belts, including two fixed one at each end of the table, and intermediate partitions defining a sorting compartment and a plurality of packing compartments arranged in line, each intermediate partition defining the adjacent ends of two adjoining compartments, an individual distributing belt for conveying fruit from the sorting compartment to each packing compartment, extending parallel to and above the line of compartments, shunt means associated with each distributing belt to transfer fruit from the latter to its respective compartment, and means for positioning said intermediate partitions in various locations lengthwise of said first two belts to vary compensably the relative sizes of adjoining compartments, increasing the length of one and correspondingly decreasing the length of the adjoining one, while preserving intact the integrity of both compartments for the circulation of fruit therein.

2. The combination of claim 1, and means supporting each of the shunt means from a partition to be shifted therewith as the partition is shifted to alter the size of the compartments.

3. A fruit sorting and packing device, comprising, in combination, a pair of fruit transfer belts disposed in contiguous relation, each to convey fruit in a direction opposite to the other, sorting compartment baffle partitions extending transversely entirely across both said fruit transfer belts to define a sorting compartment in which ungraded fruit circulates, a plurality of distributing belts readily accessible to sorters adjacent to said sorting compartment arranged in superposed relation centrally of said pair of transfer belts, a packing compartment baffle partition extending transversely entirely across both said fruit transfer belts to form two packing compartments in each of which fruit of one grade circulates, and a baffle and chute device adjacent to each packing compartment to shunt fruit from a distributing belt into the packing compartment circulating fruit of the corresponding grade.

4. A fruit conveying table comprising a pair of oppositely moving belts disposed in side by side relation, two spaced baffles fixed in position and operable to shunt fruit from one belt to the other, a partition disposed between said two baffles, extending across said pair of belts, defining with said fixed baffles two adjoining fruit circulating compartments, and constituting the adjacent ends of said adjoining fruit circulating compartments, and means for fixing said partition in various locations between said baffles, extending across said pair of belts, to vary compensably the sizes of the adjoining compartments, increasing the size of one and correspondingly decreasing the size of the other, while preserving intact the integrity of both compartments for the circulation of fruit therein.

5. A fruit conveying table comprising a pair of oppositely moving coextensive belts, disposed in side by side relation and extending lengthwise of the table, a definite number of partitions in excess of two extending transversely across said belts, including two partitions fixed one at each end of said pair of belts, and the remaining partitions being disposed intermediately between said fixed partitions and defining a definite number of adjoining fruit circulating compartments, each intermediate partition acting as the adjacent ends of two adjoining compartments, whereby the compartments in the aggregate occupy all the space between said end partitions, means to deliver fruit to each of said fruit circulating compartments, and means for positioning said intermediate partitions in various locations lengthwise of said belts to vary compensably the relative sizes of adjoining compartments, while maintaining each of said definite number of compartments intact, separate from the other compartments and operable to circulate fruit therein.

6. A fruit sorting and packing device, comprising a pair of oppositely moving belts disposed in side-by-side relation, a plurality of spaced shunt elements dividing the length of the belts into two or more packing compartments and defining the ends of such compartments, said shunt elements being disposed, with relation to the direction of movement of the belts, to effect circulation of fruit in each compartment in a closed path, and means supporting the intermediate shunt elements and guiding the latter for bodily movement longitudinally of the belts, to vary compensably the relative lengths of the different packing compartments.

7. A fruit sorting and packing device, comprising a pair of oppositely moving belts disposed in side-by-side relation, a plurality of spaced shunt elements dividing the length of the belts into two or more packing compartments and defining the ends of such compartments, said shunt elements being disposed, with relation to the direction of movement of the belts, to effect circulation of fruit in each compartment in a closed path, means supporting the intermediate shunt elements and guiding the latter for bodily movement longitudinally of the belts, to vary compensably the relative lengths of the different packing compartments, and means to deliver sorted fruit, one class into each such compartment, each of said means being operatively connected to one of the shunt elements to be shifted therewith.

8. A fruit packing table comprising a pair of oppositely moving belts disposed in side-by-side relation, their outer edges defining the edges of the table, and being accessible to packers at a number of stations spaced from end to end and at each side thereof, a plurality of shunt elements extending transversely of both belts, and spaced along the length of the belts to define the ends of a plurality of packing compartments, and in cooperation with the belts to effect circulation of fruit in each compartment in a closed path, and means supporting certain of said shunt elements, between those located at the two ends of the belts, for shifting lengthwise of the belts, thereby to include a greater number of packing stations in any one compartment and a lesser number in an adjoining compartment.

9. A fruit conveying table comprising a pair of oppositely moving belts disposed in contiguous edge to edge relation, two upright flanges disposed one in contiguous relation to each of the remote edges of said belts, two spaced shunting members fixed in position and operable to shunt fruit from one belt to the other, a partition disposed between said shunting members and extending across said belts, to form with said shunting members and flanges two adjoining fruit circulating compartments, and means supporting said partition from said two flanges for disposition in various locations lengthwise of said belts, to vary compensably the lengths of said adjoining compartments, increasing the size of one and correspondingly decreasing the size of the other, while preserving intact the integrity of both compartments for the circulation of fruit therein.

10. A fruit conveying unit comprising a table, an upright flange extending along each edge of said table, workmen's stations along both sides of said table immediately adjacent thereto, two oppositely moving belts, each of a width substantially half the width of said table, disposed on said table in edge to edge relationship and between said table flanges, and a plurality of shunting members extending crosswise of said belts to shunt fruit from one belt to the other and back to the first again, the directions of movement of said belts and the disposition of said members being such as to effect circulation of the fruit in a counter-clockwise direction.

11. A fruit sorting and packing device comprising a table having a plurality of worker's stations at each side thereof, means operable to advance the fruit upon said table in a closed path past every station at one side, thence across to the opposite side and past every station at that side, and then back to the point of commencement, one or more intercepting members disposed transversely of the path of the fruit, between its ends, to convert the single path of circulation into a plurality of closed paths, each within a compartment defined either by two adjoining intercepting members, or by an intercepting member and an adjoining end of the original closed path, and means whereby each intercepting member may be shifted bodily, lengthwise of the original path of the fruit, to compensably vary the length of each of two adjoining compartments, and to include a station, formerly at the end of one compartment, within the adjoining compartment.

ERNEST R. SANDMEYER.